United States Patent [19]

Amata et al.

[11] Patent Number: 5,094,598
[45] Date of Patent: Mar. 10, 1992

[54] CAPACITY CONTROLLABLE COMPRESSOR APPARATUS

[75] Inventors: Atushi Amata, Shizuoka; Naoshi Uchikawa; Hiroaki Kuno, both of Shimizu, all of Japan

[73] Assignee: Hitachi, Ltd., Tokyo, Japan

[21] Appl. No.: 536,798

[22] Filed: Jun. 12, 1990

[30] Foreign Application Priority Data

Jun. 14, 1989 [JP] Japan .................................. 1-149668

[51] Int. Cl.[5] ............................................. F04B 23/04
[52] U.S. Cl. ...................................... 417/533; 62/468; 62/510; 417/7
[58] Field of Search ............... 417/7, 533; 62/84, 468, 62/470, 510

[56] References Cited

U.S. PATENT DOCUMENTS

| 1,114,019 | 10/1914 | Morris . | |
| 2,008,449 | 7/1935 | Hladik | 121/34 |
| 2,326,138 | 8/1943 | Grant, Jr. | 74/110 |
| 2,550,379 | 4/1951 | Rapisarda | 299/95 |
| 3,581,519 | 6/1971 | Garrett et al. | 62/468 X |
| 3,621,670 | 11/1971 | Kinney | 62/468 X |
| 3,633,377 | 1/1972 | Quick | 62/470 X |
| 4,102,149 | 7/1978 | Conley et al. | 62/468 X |
| 4,383,802 | 5/1983 | Gianni et al. | 62/510 X |
| 4,411,141 | 10/1983 | Hara | 62/468 |
| 4,586,351 | 5/1986 | Igarashi et al. | 62/468 |

OTHER PUBLICATIONS

PT Werktuigbouw, vol. 21a, No. 5, Mar. 2, 1966, Rijswijk NL, pp. 206A–210A, Knotsenborg, "Automatische olienivellering voor parallel werkende freon compressoren".

Primary Examiner—Stephen M. Hepperle
Attorney, Agent, or Firm—Antonelli, Terry, Stout & Kraus

[57] ABSTRACT

A capacity controllable compressor apparatus has a plurality of high-pressure chamber compressors which are connected in parallel to a common refrigerant suction pipe and a common refrigerant discharge pipe, and oil equalizing pipes through which oil sumps of the plurality of compressors are communicated with each other. One of the plurality of compressors is operated with its chamber kept at a higher internal pressure than other compressors. The compressor apparatus comprises an oil separator disposed to the common discharge pipe; device for returning lubricating oil separated by the oil separator to a suction side of one of the compressors operated with its chamber kept at a higher internal pressure; first control device disposed in the oil equalizing pipes so as to prevent the lubricating oil from flowing into one of the two compressors communicated with each other by the oil equalizing pipe, said one being made inoperative when the capacity of the compressor apparatus is controlled; and valve device disposed in a discharge pipe of the inoperative compressor so as to prevent refrigerant from flowing into the inoperative compressor.

29 Claims, 11 Drawing Sheets

CAPACITY CONTROLLABLE COMPRESSOR APPARATUS

SUMMARY OF THE INVENTION

The present invention relates to a compressor apparatus having a plurality of parallel connected high-pressure chamber compressors and, more particularly, to a compressor apparatus which is capable of controlling its overall capacity by making inoperative that is, some of these high-pressure chamber compressors or by controlling the capacities of the compressors.

It is preferable for an air conditioning equipment (or system) serving to effect air conditioning of a plurality of rooms, or a refrigerating device serving to cool a plurality of freezing rooms, or the like, that the capacity of a compressor apparatus used therein can be varied in accordance with a change in the number of rooms to be subjected to air conditioning or the number of freezing rooms to be cooled, respectively. This type of capacity controllable compressor apparatus has, as shown in FIG. 20, a plurality of parallel-connected compressors with their oil sumps connected with each other by means of oil equalizing pipes, so that the overall capacity thereof is controlled by making inoperative some of the compressors or by varying the capacities of the compressors. In this type of compressor apparatus, when all the compressors are operated, internal pressure in the chambers of all the compressors are not substantially equalized with each other due to the manufacturing variation among the individual compressors, pipes and the like. For this reason, the amount of lubricating oil of each compressor is not uniform, whereby nonuniform distribution of the lubricating oil among the compressors results. Meanwhile, when the capacity control is effected by making inoperative some of the compressors, there is a problem that a part of the high-pressure gas, such as a gas compressed by other compressor, flows into the inoperative compressor and is dissolved in the lubricating oil of a relatively low temperature in the chamber of the inoperative compressor resulting in a dilution of the lubricating oil thereat. Further, when the compressor is started again, the liquid refrigerant thus dissolved is compressed and there occurs a foaming which results in an undesirable increase in the amount of the oil being drawn into the compression space, so that the efficiency of the compressor is decreased. In addition, the internal pressure in the chamber of the inoperative compressor becomes slightly lower than the internal pressure in the chamber of the compressor(s) in operation, so that there is a problem in this case as well that the lubricating oil is distributed nonuniformly among the compressors.

There has been made a proposal for solving the problem of nonuniform distribution of the lubricating oil in the compressor apparatus having a plurality of parallel-connected compressors, as disclosed in Japanese Patent Unexamined Publication No. 57-51982. This proposal, however, has a problem of lowering of the efficiency of each compressor because the pressures in the low-pressure chambers of the respective, parallel-connected compressors are differed by making use of the pressure loss in the intake pipe. In particular, since the suction pressure is decreased, the applicable range of the compressor apparatus is limited disadvantageously. This method is applicable to the low-pressure chamber compressor but it is not suitable for the high-pressure chamber compressor in which the chamber is kept at a high pressure as a whole.

An object of the present invention is to provide a compressor apparatus which is free from non-uniform distribution of lubricating oil both when all compressors are operated and when a capacity control is effected by making inoperative some of the compressors.

Another object of the present invention is to provide a compressor apparatus in which compressed gas is not dissolved in the lubricating oil when the capacity control is effected by making inoperative some of the compressors thereby preventing dilution of the lubricating oil.

Still another object of the present invention is to provide a compressor apparatus which is free from the lowering of the efficiency of the compressor due to an increase in the amount of the oil drawn into the compression space attributable to compression and foaming of liquid refrigerant when the inoperative compressor is started again.

SUMMARY OF THE INVENTION

A capacity controllable compressor apparatus according to the present invention comprises: a plurality of high-pressure chamber compressors which are connected in parallel to a common refrigerant suction pipe and a common refrigerant discharge pipe having an oil separator, one of said compressors being operated with its chamber kept at a higher internal pressure than other compressors; means for returning lubricating oil separated by said oil separator to a suction side of one of said compressors operated with its chamber kept at a higher internal pressure; oil equalizing pipes through which oil sumps of said plurality of compressors are communicating with each other; first control means disposed in said oil equalizing pipes so as to prevent the lubricating oil from flowing into one of the two compressors communicating with each other by means of said oil equalizing pipe, and which said one of the two compressors is made inoperative when the capacity of the compressor apparatus is being controlled; and valve means disposed in a discharge pipe of said inoperative compressor so as to prevent refrigerant from flowing into said inoperative compressor.

The first control means includes check valves disposed in the oil equalizing pipes or stop valves serving to close the oil equalizing pipes so as to prevent the lubricating oil from flowing into the inoperative compressor.

The valve means includes a check valve disposed to prevent the refrigerant from flowing into the inoperative compressor.

The lubricating oil return means includes an oil return pipe connected between the oil separator and a refrigerant suction pipe of the compressor operated with its chamber kept at a high internal pressure, and communication pipes each serving to communicate between adjacent refrigerant suction pipes of the plurality of compressors at a point downstream of a point where the oil return pipe is connected to the aforesaid refrigerant suction pipe. These communication pipes may be dispensed with. The oil return pipe may be connected with a space in the compressor operated with its chamber kept at a high internal pressure, the pressure in the space corresponding to an intermediate pressure obtained in the course of the compression stroke.

In an embodiment, a plurality of oil return pipes are provided for connecting between the oil separator and spaces in the plurality of compressors, the pressure in each space corresponding to an intermediate pressure obtained in the course of the compression stroke. In this case, it is required to dispose stop valves for closing the oil return pipes.

The internal pressure of the compressor may be increased by means of making larger the flow resistance of the discharge pipe of the compressor.

Further, it is preferred that the oil equalizing pipe extends to project into the oil sump of the compressor located on the upstream side with respect to the flow of the lubricating oil.

When all of the compressors are operating, the lubricating oil separated from the high-pressure gas refrigerant by the oil separator is returned to the compressor operated at an increased internal pressure and then supplied from this compressor to the other compressor. It is therefore possible to prevent the nonuniform distribution of the lubricating oil.

When the capacity of the compressor apparatus is controlled by making inoperative some of the compressors, the lubricating oil is returned to the compressor which is operating at an increased internal pressure among the compressors in operation with the inoperative compressor isolated within the circuit, thereby preventing the high-pressure gas refrigerant and the lubricating oil from flowing into the inoperative compressor. It is therefore possible to prevent the nonuniform distribution of the lubricating oil and to prevent the compression of the liquid refrigerant and the occurrence of the foaming when the inoperative compressor is started again, thereby avoiding the lowering of the efficiency of the compressor apparatus.

DESCRIPTION OF THE PREFERRED EMBODIMENTS

Description will be given below of preferred embodiments of the compressor apparatus according to the present invention with reference to the accompanying drawings.

Figure 1:
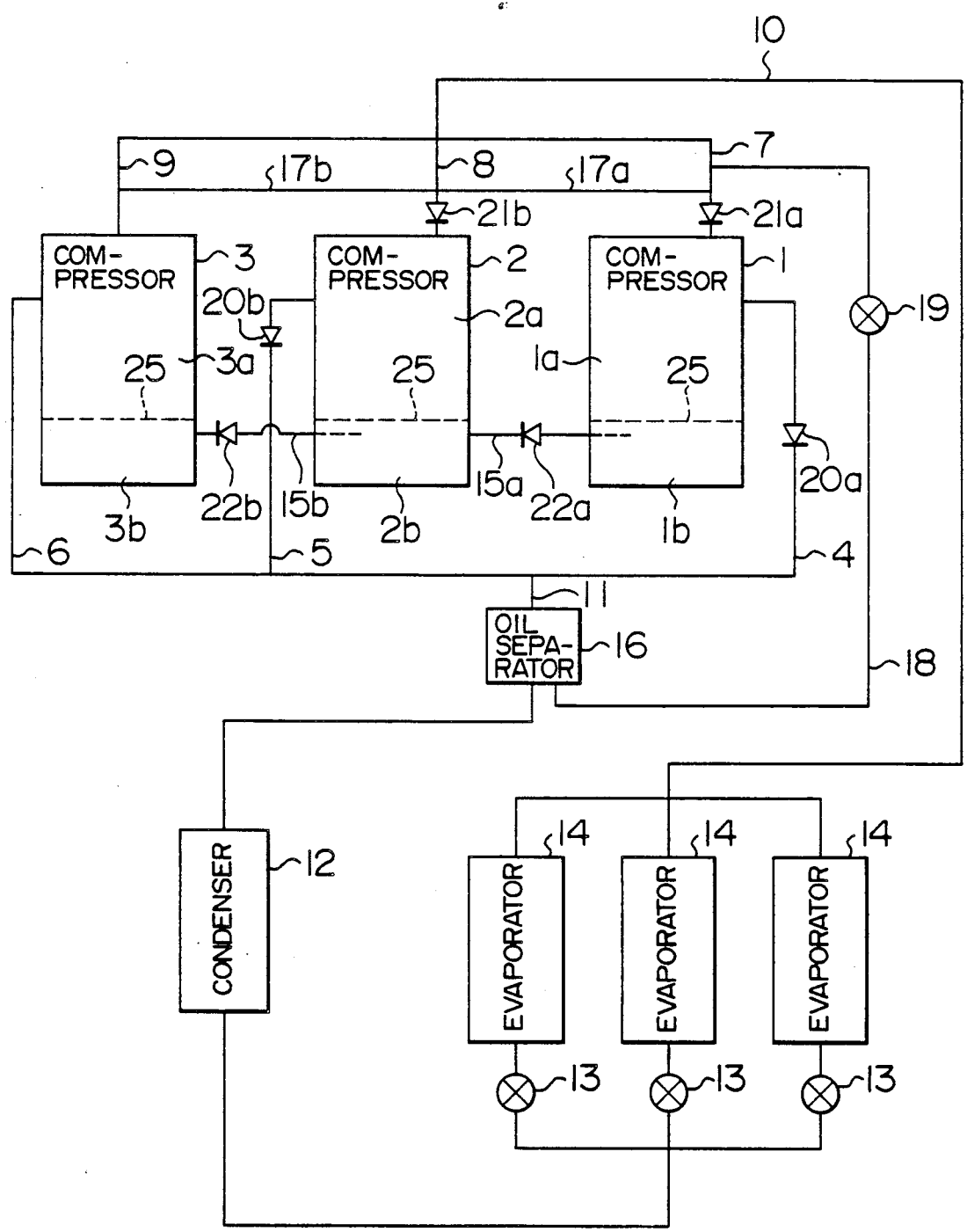
FIG. 1 is a schematic circuit diagram of an embodiment of a compressor apparatus according to the present invention when applied to a refrigerating device having a plurality of evaporators.

FIG. 1 shows a first embodiment of the compressor apparatus according to the present invention. The compressor apparatus has three high-pressure chamber compressors 1, 2 and 3 which are connected in parallel to a common suction pipe 10 and a common discharge pipe 11. The compressors 1, 2 and 3 are of the fixed capacity type. The compressor 1 is operated at a higher frequency than the other compressors 2 and 3. Further, the compressor 2 is operated at a higher frequency than the compressor 3. An oil sump $1b$ of the compressor 1 communicates with an oil sump $2b$ of the compressor 2 by means of an oil equalizing pipe $15a$, and the oil sump $2b$ of the compressor 2 communicates with an oil sump $3b$ of the compressor 3 by means of an oil equalizing pipe $15b$. The oil equalizing pipes $15a$ and $15b$ are provided with check valves $22a$ and $22b$, respectively, so that the check valves $22a$ and $22b$ permit lubricating oil to flow from the compressor 1 to the compressor 2 and from the compressor 2 to the compressor 3, respectively. A suction pipe 7 of the compressor 1 communicates with a suction pipe 8 of the compressor 2 by means of a communication pipe $17a$, and the suction pipe 8 of the compressor 2 communicates with a suction pipe 9 of the compressor 3 by means of a communication pipe $17b$. Discharge pipes 4 and 5 are provided with check valves $20a$ and $20b$, respectively, so as to prevent the backward flowed or reverse flow) of compressed gas. The common discharge pipe 11 is provided with an oil separator 16 for separating the lubricating oil from the high pressure gas, which is a high-pressure gas refrigerant, in this embodiment, discharged from each of the compressors. An oil return pipe 18 is connected to the oil separator 16 for returning the lubricating oil thus separated to the compressors. The oil return pipe 18 is connected to the suction pipe 7 of the compressor 1 at a point upstream of a point where the communication pipe $17a$ is connected to the suction pipe 7. A check valve $21a$ is disposed in the suction pipe 7 at a point downstream of the point of connection of the communication pipe $17a$ so as to prevent the refrigerant from flowing out of the compressor 1. Likewise, a check valve $21b$ is disposed in the suction pipe 8 of the compressor 2.

A condenser 12 is connected to the oil separator 16. A plurality of parallel-connected evaporators 14 are connected to the condenser 12 through decompression devices 13. Each of the evaporators 14 is connected to the common suction pipe 10, thus completing a refrigerating cycle.

In the case when the high-pressure chamber compressors 1, 2 and 3 are operated simultaneously, the compressor 1 is operated at a higher frequency, that is, with a larger capacity, than the other compressor 2, 3 so that the velocity of the refrigerant flowing through the discharge pipe 4 of the compressor 1 becomes higher than that of the refrigerant flowing through the discharge pipes 5, 6 of the other compressors 2, 3. Consequently, the pressure loss in the discharge pipe 4 becomes greater than that in the discharge pipes 5, 6. Since the pressure is equalized in the common discharge pipe 11 to which the respective discharge pipes 4, 5 and 6 are connected, the internal pressure of the chamber of the compressor 1 is increased by an amount corresponding to a difference in the pressure loss. The high-pressure gas refrigerant containing the lubricating oil is discharged from the respective compressors 1, 2 and 3 to be separated from the lubricating oil by means of the oil separator 16 and is then fed to the condenser 12 through the common discharge pipe 11. The lubricating oil thus separated is returned through the oil return pipe 18 and a decompression device 19 to the suction pipe 7 of the compressor 1. The lubricating oil is then returned to the respective compressors 1, 2 and 3 through the suction pipe 7 and the communication pipes $17a$ and $17b$. Further, the lubricating oil gathered in the oil sump $1b$ of the compressor 1 is supplied to the compressors 2 and 3 through the oil equalizing pipes $15a$ and $15b$ due to a difference in the internal pressure between the compressors 1 and 2. Since the oil equalizing pipes $15a$ and $15b$ are extended so as to project into the oil sumps of the compressors located on the upstream side as shown in FIG. 1, when an oil level 25 in the compressor on the upstream side is lowered below an opening of the oil equalizing pipe 15a or 15b, the returned lubricating oil is prevented from being supplied to the compressor on the downstream side by flowing down along the chamber wall of the compressor, thus making it possible to keep the oil level 25 in the compressor on the upstream side at a regular position. It is therefore possible to prevent the nonuniform distribution of the lubricating oil.

When the compressor apparatus is operated in a capacity controlling mode in which the compressor 1 is made inoperative, the high-pressure gas refrigerant discharged through the discharge pipes 5 and 6 of the compressors 2 and 3 is prevented from flowing into the compressor 1 by means of the check valve 20a disposed in the discharge pipe 4 of the compressor 1. The lubricating oil separated from the high-pressure gas refrigerant by means of the oil separator 16 is returned to the suction pipe 7 of the compressor 1 through the oil return pipe 18 and the decompression device 19. Since the inside of the compressor 1 is kept at a high internal pressure by means of the check valve 21a, the lubricating oil thus returned is not allowed to flow into the compressor 1, instead of which it is directed to the suction pipe 8 of the compressor 2 through the communication pipe 17a. The lubricating oil is then returned to the compressors 2 and 3 through the suction pipe 8 and the communication pipe 17b. Further, the lubricating oil gathered in the oil sump 2b of the compressor 2 is supplied through the oil equalizing pipe 15b to the compressor 3 due to a difference in the internal pressure between the compressors 2 and 3. The lubricating oil in the compressor 2 is prevented from being supplied to the compressor 1 by means of the check valve 22a of the oil equalizing pipe 15a. Since the oil equalizing pipe 15b is extended so as to project into the oil sump of the compressor 2 located on the upstream side as shown in FIG. 1, when the oil level 25 in the compressor 2 on the upstream side is lowered below the opening of the oil equalizing pipe 15b, the returned lubricating oil is prevented from being supplied to the compressor 3 on the downstream side by flowing down along the chamber wall of the compressor 2, thus making it possible to keep the oil level 25 in the compressor 2 on the upstream side at a regular position. It is therefore possible to prevent the lubricating oil from being nonuniformly distributed between the compressors 2 and 3 and to keep the quantity of the lubricating oil in the oil sump of the compressor 1 at a regular quantity. Further, since the high-pressure gas refrigerant discharged from the compressors 2 and 3 is prevented from flowing into the compressor 1, there is no possibility that the refrigerant dissolves in the lubricating oil in the compressor 1 to dilute the lubricating oil. In addition, even when the compressor 1 is started again, there is no compression of a liquid refrigerant and no occurrence of the foaming, thereby preventing the lowering of the efficiency of the compressor apparatus.

Also when the compressor apparatus is operated in a capacity controlling mode in which the compressor 3 alone is operated while the compressors 1 and 2 are made inoperative, the high-pressure gas refrigerant discharged from the compressor 3 is prevented from flowing into the compressors 1 and 2 by means of the check valves 20a and 20b in the same manner as mentioned above. Further, the lubricating oil separated by means of the oil separator 16 is returned through the oil return pipe 18 while being prevented from flowing into the compressors 1 and 2 by means of the check valves 21a and 21b. Consequently, it is possible, in this case as well, to prevent dilution of the lubricating oil, compression and foaming of the liquid refrigerant.

Figure 2:
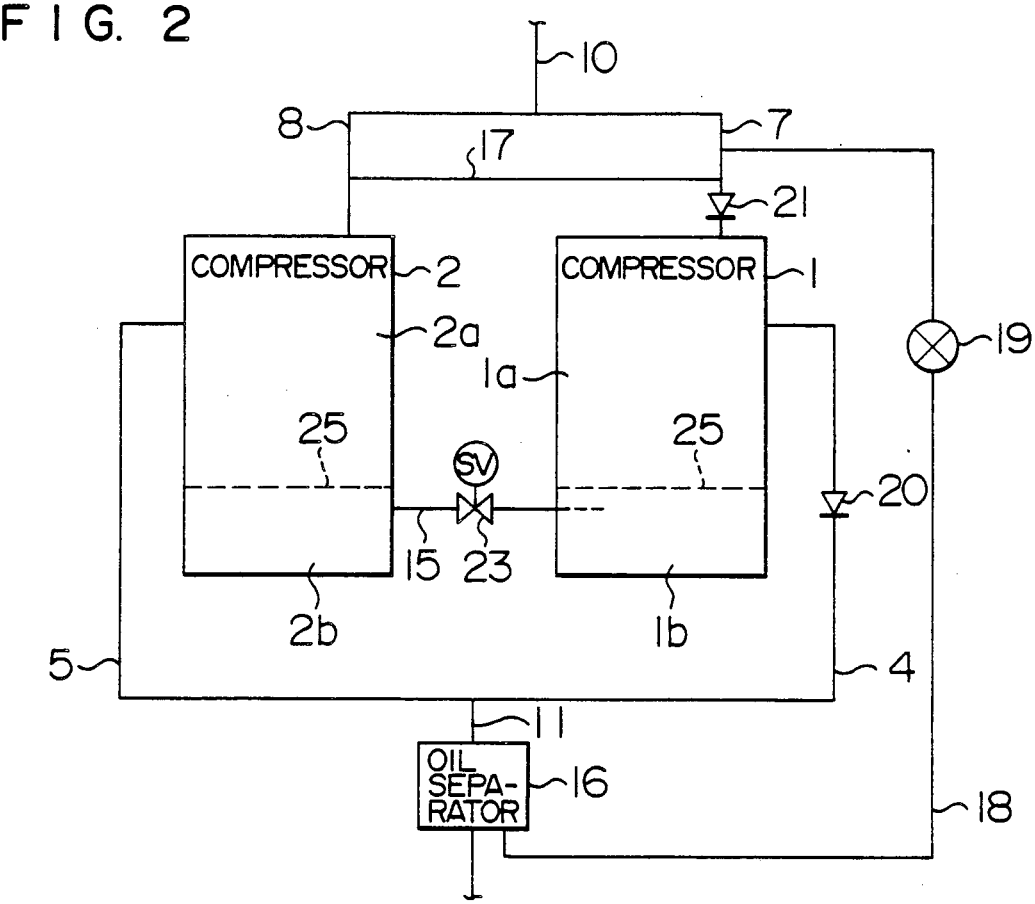
FIGS. 2 to 19 are schematic structural diagrams of other embodiments of the compressor apparatus according to the present invention.

FIG. 2 shows a second embodiment of the compressor apparatus according to the present invention. In this embodiment, two high-pressure chamber compressors 1 and 2 are connected in parallel, and the compressor 1 is operated at a higher frequency than the compressor 2. An oil equalizing pipe 15 is provided with a stop valve 23 which serves to close the oil equalizing pipe 15, in place of the check valves 22a and 22b. Other arrangements are identical with those of the first embodiment so that explanation thereof will be omitted.

In case that the two compressors 1 and 2 are operated simultaneously, the stop valve 23 disposed in the oil equalizing pipe 15 is opened. The compressor 1 is operated at a higher frequency, that is, with a larger capacity, than the compressor 2 so that the velocity of the refrigerant flowing through the discharge pipe 4 of the compressor 1 becomes higher than that of the refrigerant flowing through the discharge pipe 5 of the compressor 2. Consequently, the pressure loss in the discharge pipe 4 becomes greater than that in the discharge pipe 5. Since the pressure is equalized in the common discharge pipe 11 to which the respective discharge pipes 4 and 5 are connected, the internal pressure of the chamber of the compressor 1 is increased by an amount corresponding to a difference in the pressure loss. The high-pressure gas refrigerant containing the lubricating oil is discharged from the respective compressors 1 and 2 to be separated from the lubricating oil by means of the oil separator 16 and is then fed to the condenser (not shown in FIG. 2). The lubricating oil thus separated is returned through the oil return pipe 18 and the decompression device 19 to the suction pipe 7 of the compressor 1. The lubricating oil is then returned to the respective compressors 1 and 2 through the suction pipe 7 and the communication pipe 17. Further, the lubricating oil gathered in the oil sump 1b of the compressor 1 is supplied to the compressor 2 through the oil equalizing pipe 15 due to a difference in the internal pressure between the compressors 1 and 2. Since the oil equalizing pipe 15 is extended so as to project into the oil sump 1b of the compressor 1 located on the upstream side similarly to the first embodiment, when the oil level 25 in the compressor 1 on the upstream side is lowered below the opening of the oil equalizing pipe 15, the returned lubricating oil is prevented from being supplied to the compressor 2 on the downstream side by flowing down along the chamber wall of the compressor, thus making it possible to keep the oil level 25 in the compressor 1 on the upstream side at a regular position. It is therefore possible to prevent the nonuniform distribution of the lubricating oil.

When the compressor apparatus is operated in a capacity controlling mode in which the compressor 1 is made inoperative, the high-pressure gas refrigerant discharged through the discharge pipe 5 of the compressor 2 is prevented from flowing into the compressor 1 by means of the check valve 20 disposed in the discharge pipe 4 of the compressor 1. The lubricating oil separated from the high-pressure gas refrigerant by means of the oil separator 16 is returned to the suction pipe 7 of the compressor 1 through the oil return pipe 18 and the decompression device 19. Since the inside of the compressor 1 is kept at a high internal pressure by means of the check valve 21, the lubricating oil thus returned is not allowed to flow into the compressor 1 but made to return to the suction pipe 8 of the compressor 2 through the communication pipe 17. The lubricating oil is then returned to the compressor 2 through the suction pipe 8 and the communication pipe 17. The lubricating oil in the compressor 2 is prevented from being supplied to the compressor 1 by closing the stop valve 23 of the oil equalizing pipe 15. It is therefore possible to keep the lubricating oil in the compressor 2 in the normal state. Further, since the high-pressure gas refrigerant discharged from the compressor 2 is prevented from flowing into the compressor 1, there is no possibility that the refrigerant dissolves in the lubricating oil in the compressor 1 to dilute the lubricating oil. In addition, even when the compressor 1 is started again, there is no compression of the liquid refrigerant and no occurrence of foaming, thereby preventing the lowering of the efficiency of the compressor apparatus.

Figure 3:
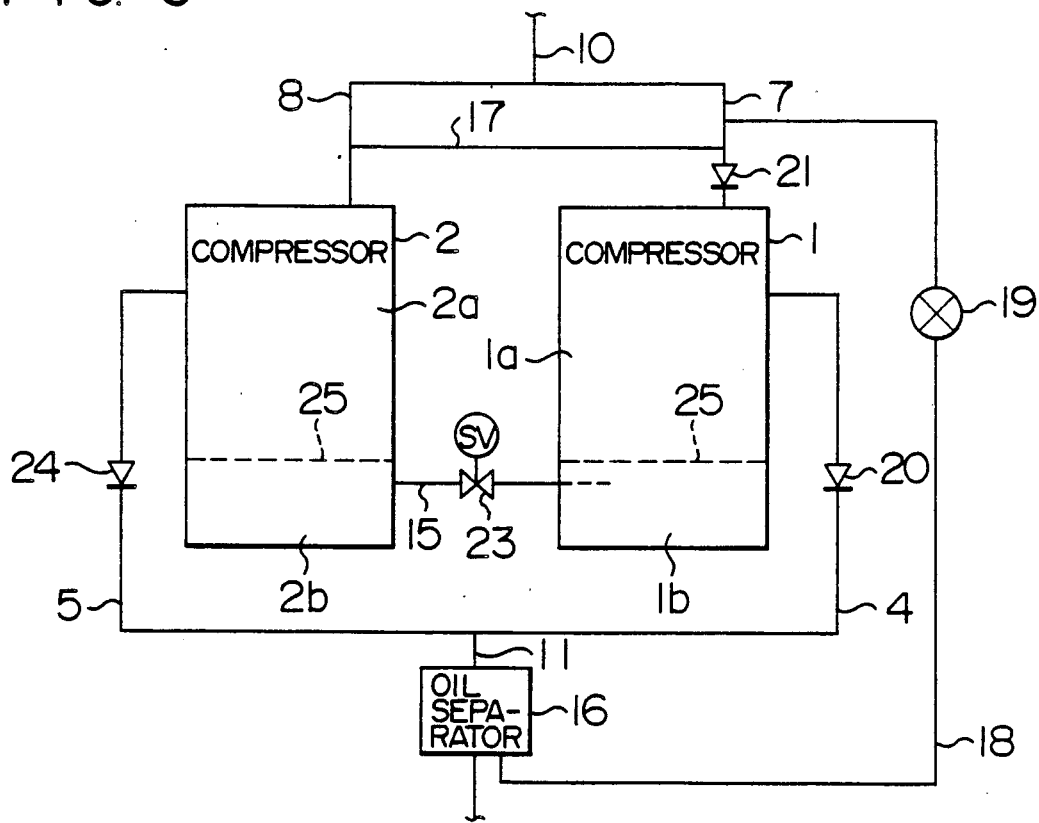

FIG. 3 shows a third embodiment of the compressor apparatus according to the present invention. In the third embodiment, a check valve 24 is disposed, in addition, in the discharge pipe 5 of the compressor 2 of the second embodiment so as to prevent the high-pressure gas refrigerant from flowing into the compressor 2. Other arrangements are identical with those of the second embodiment so that explanation thereof will be omitted.

Functions effected when the two compressors 1 and 2 are operated simultaneously and when the compressor 1 is made inoperative in the capacity controlling mode are identical with those in the second embodiment so that explanation thereof will be omitted.

When the compressor apparatus is operated in a capacity controlling mode in which the compressor 2 is made inoperative, the high-pressure gas refrigerant discharged through the discharge pipe 4 of the compressor 1 is prevented from flowing into the compressor 1 by means of the check valve 24 disposed in the discharge pipe 5 of the compressor 2. The lubricating oil separated from the high-pressure gas refrigerant by means of the oil separator 16 is returned to the suction pipe 7 of the compressor 1 through the oil return pipe 18 and the decompression device 19 by which the pressure of the lubricating oil is reduced to a suction pressure level. Since the inside of a chamber 2a of the compressor 2 is kept at a high pressure, the returned lubricating oil kept at the suction pressure is scarcely allowed to flow into the compressor 2 through the communication pipe 17 so as to be returned to the compressor 1. The lubricating oil in the compressor 1 is prevented from being supplied to the compressor 2 by closing the stop valve 23 of the oil equalizing pipe 15. It is therefore possible to keep the lubricating oil in the compressor 1 in the normal state. Further since the high-pressure gas refrigerant discharged from the compressor 1 is prevented from flowing into the compressor 2, there is no possibility that the refrigerant dissolves in the lubricating oil in the compressor 2 to dilute the lubricating oil. In addition, even when the compressor 2 is started again, there is no compression of the liquid refrigerant and no occurrence of the foaming, thereby preventing the lowering of the efficiency of the compressor apparatus. In this embodiment, since it is possible to stop either of the compressors 1 and 2, the lifetime of the compressor apparatus can be extended.

Figure 4:
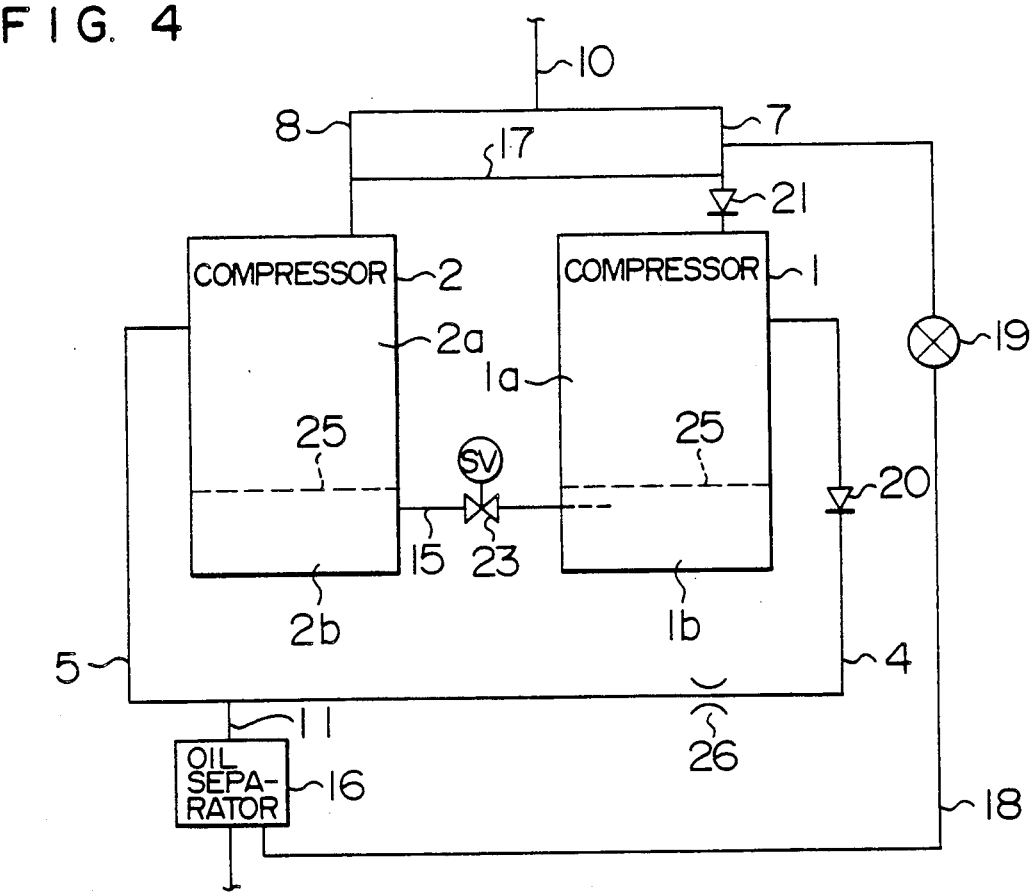
Figure 5:
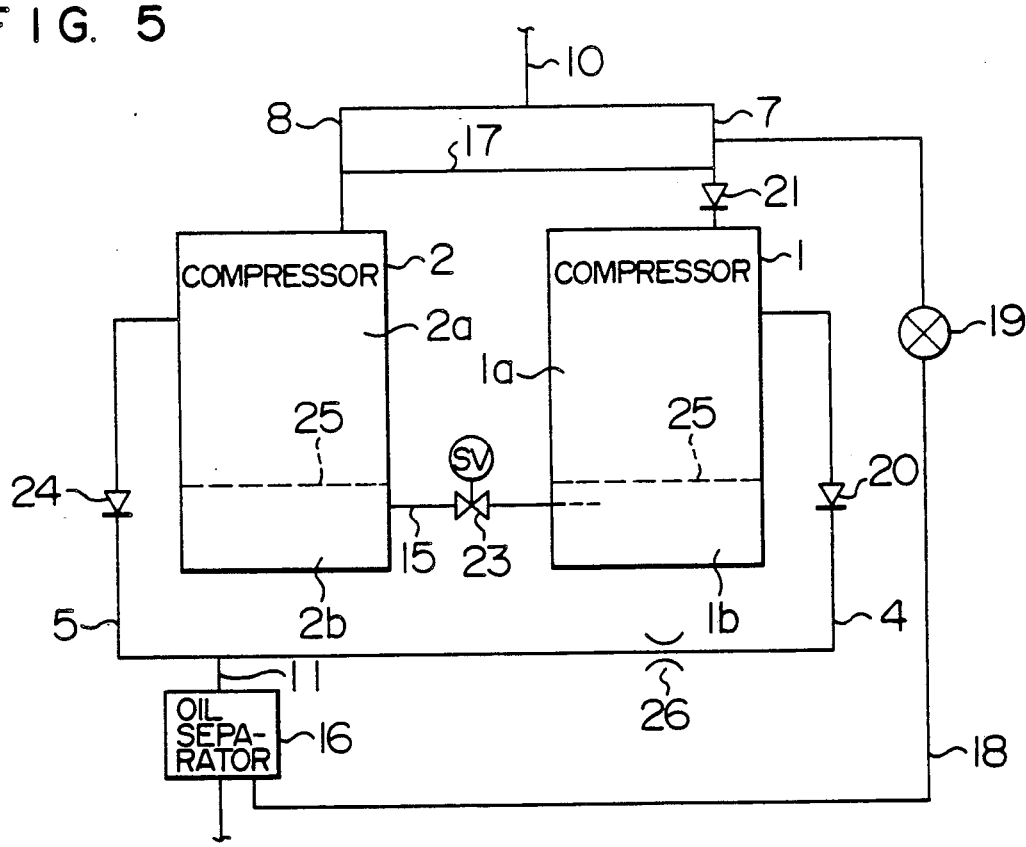

FIGS. 4 and 5 show respectively fourth and fifth embodiments of the compressor apparatus according to the present invention. The fourth and fifth embodiments are modifications of the second and third embodiments, respectively, in which a throttle 26 serving to increase the flow resistance of the pipe is disposed in the discharge pipe 4. Instead of disposing the throttle 26, the length and/or the diameter of the pipe may be adjusted to increase the flow resistance. By making larger the flow resistance of the discharge pipe 4 than that of the discharge pipe 5, the internal pressure of the chamber 1a of the compressor 1 becomes higher than that of the compressor 2.

Functions are identical with those in the second and third embodiments, respectively, so that explanation thereof will be omitted.

In these embodiments, since the compressors 1 and 2 can be operated at the same frequency, the construction of the compressor apparatus can be simplified.

Figure 6:
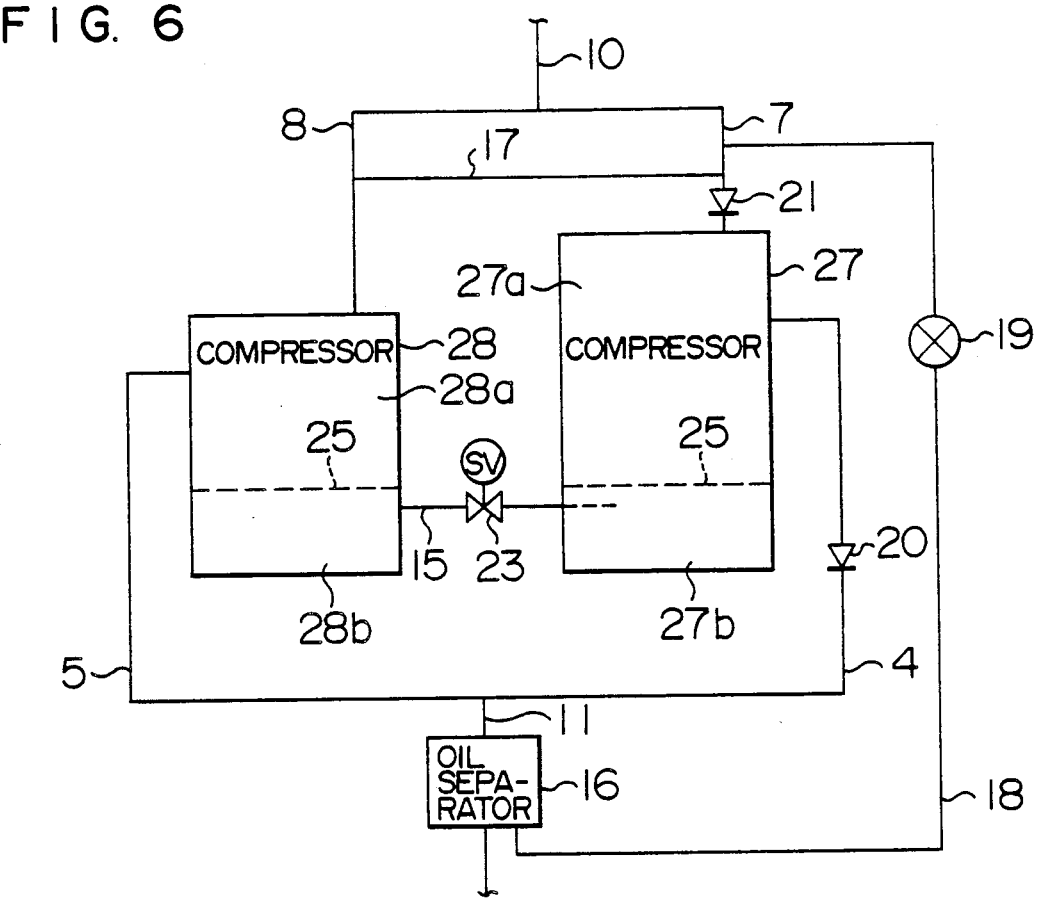
Figure 7:
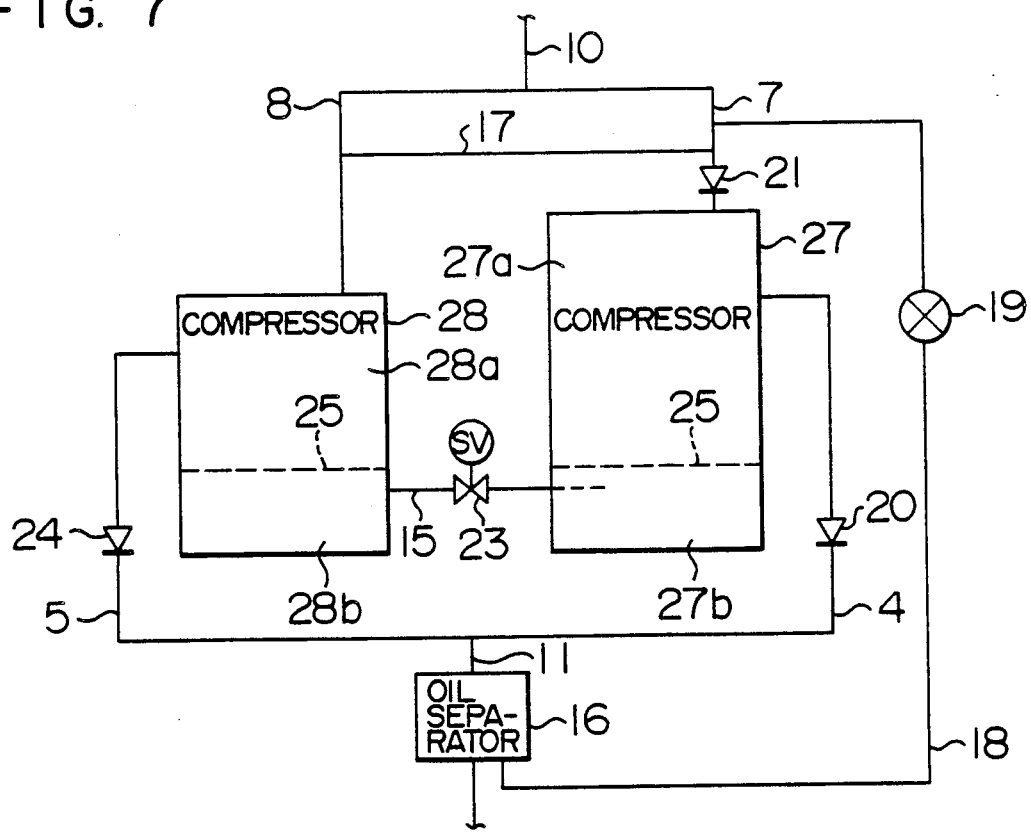
Figure 8:
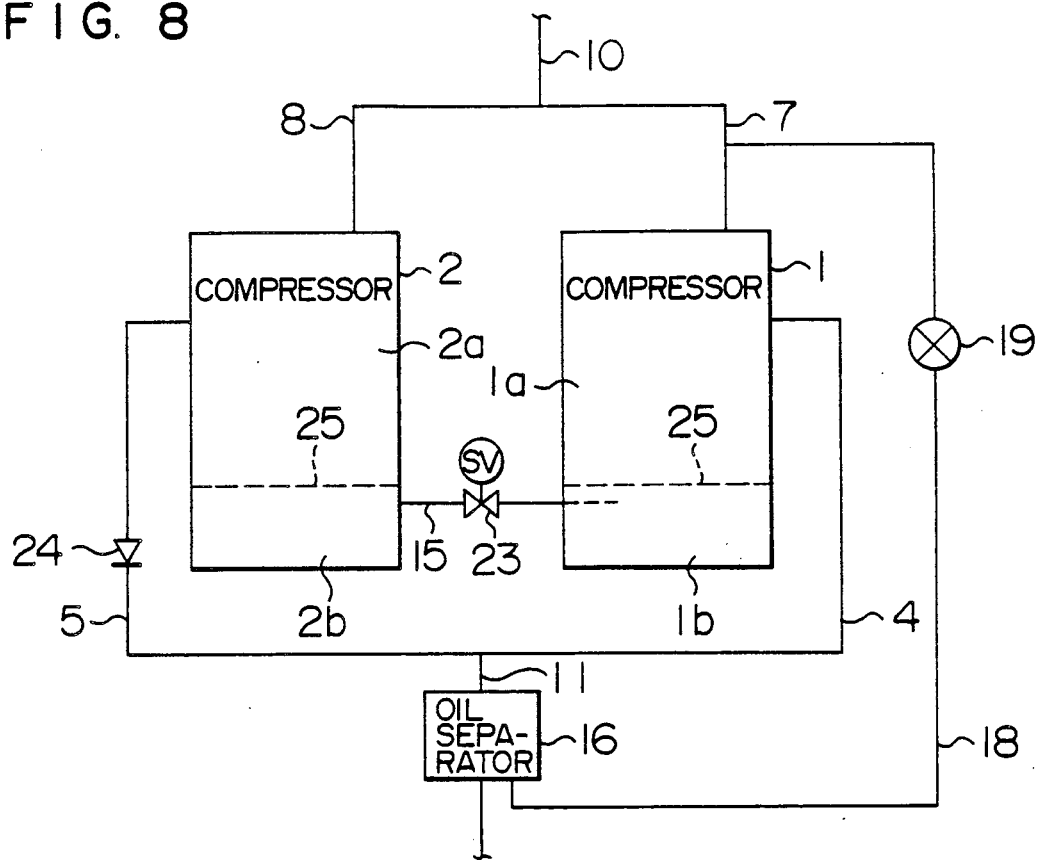
Figure 9:
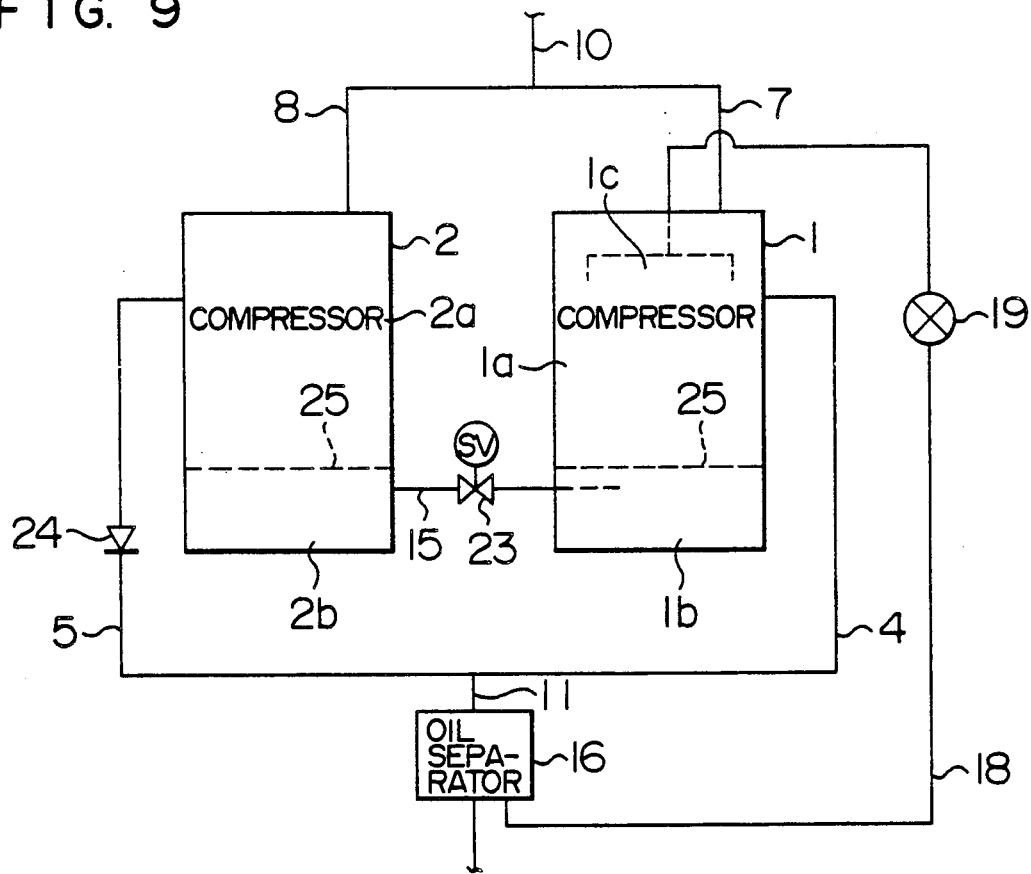
Figure 10:
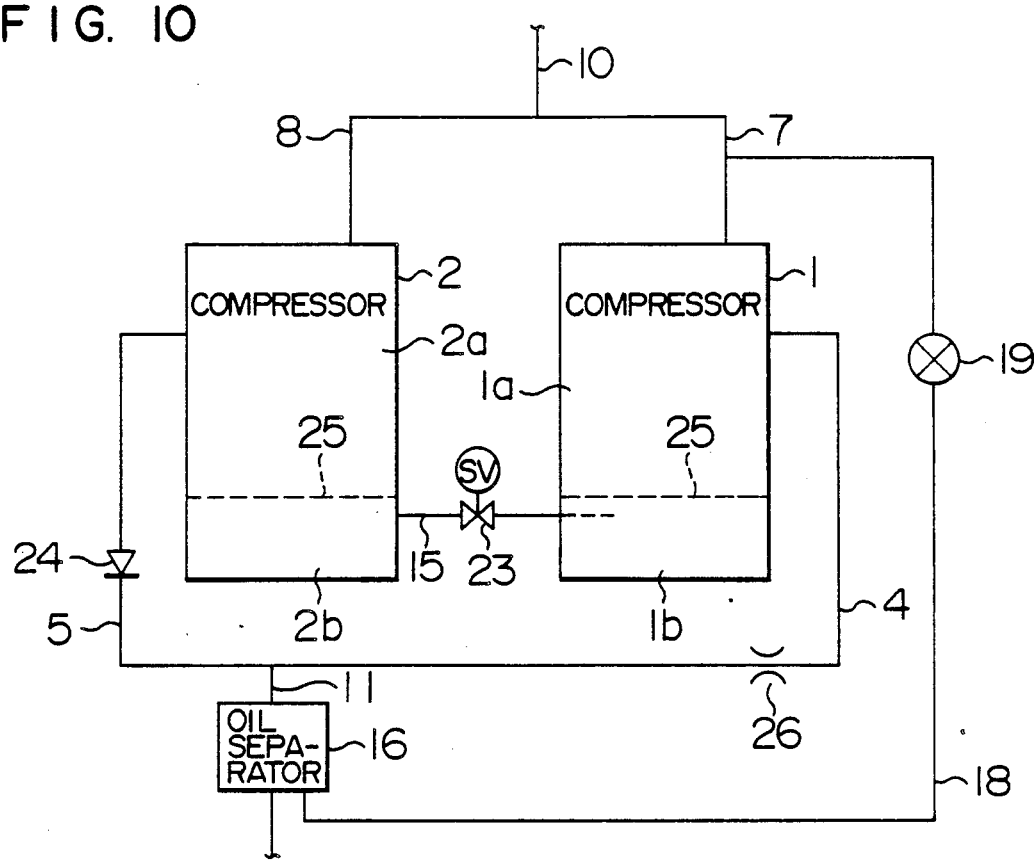
Figure 11:
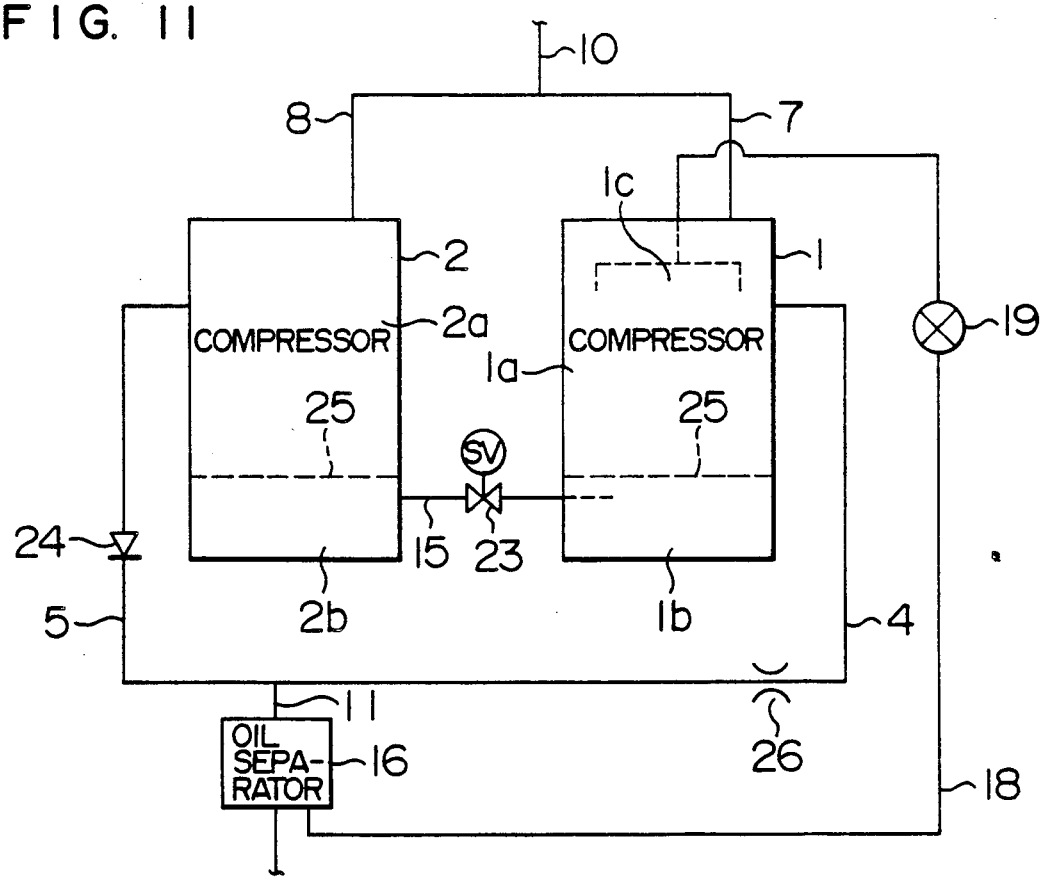
Figure 12:
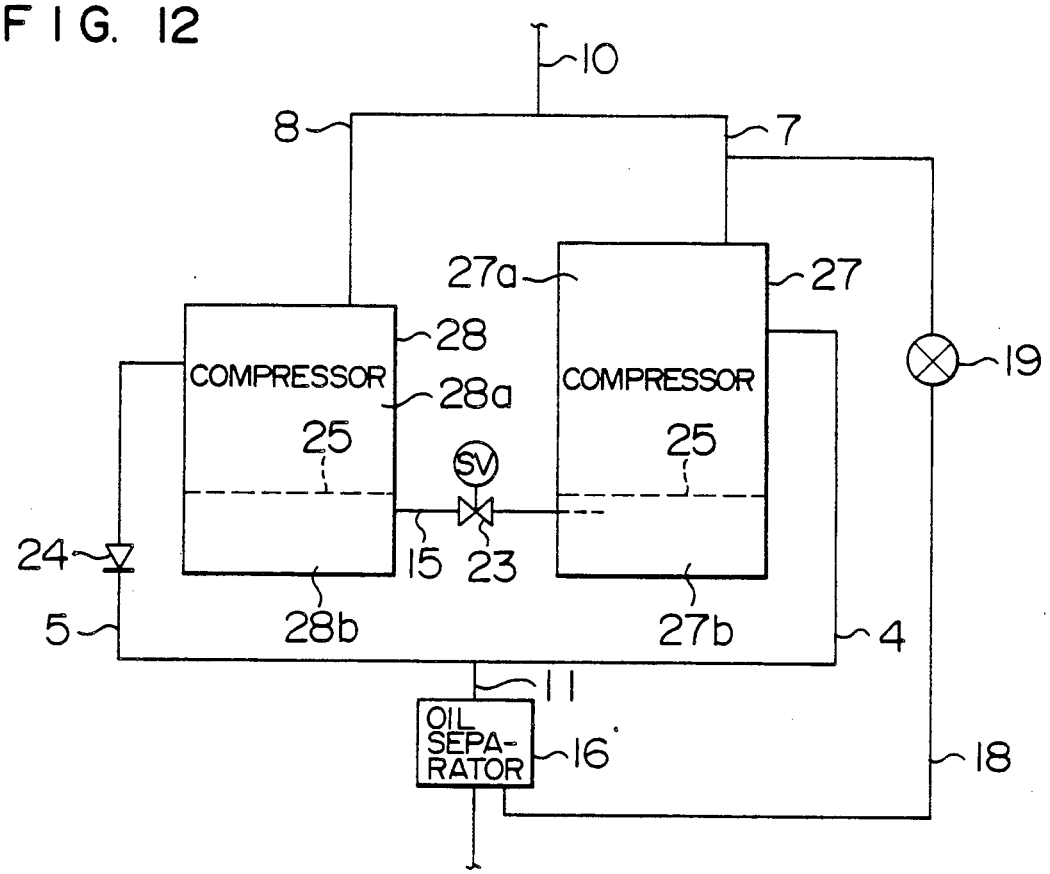
Figure 13:
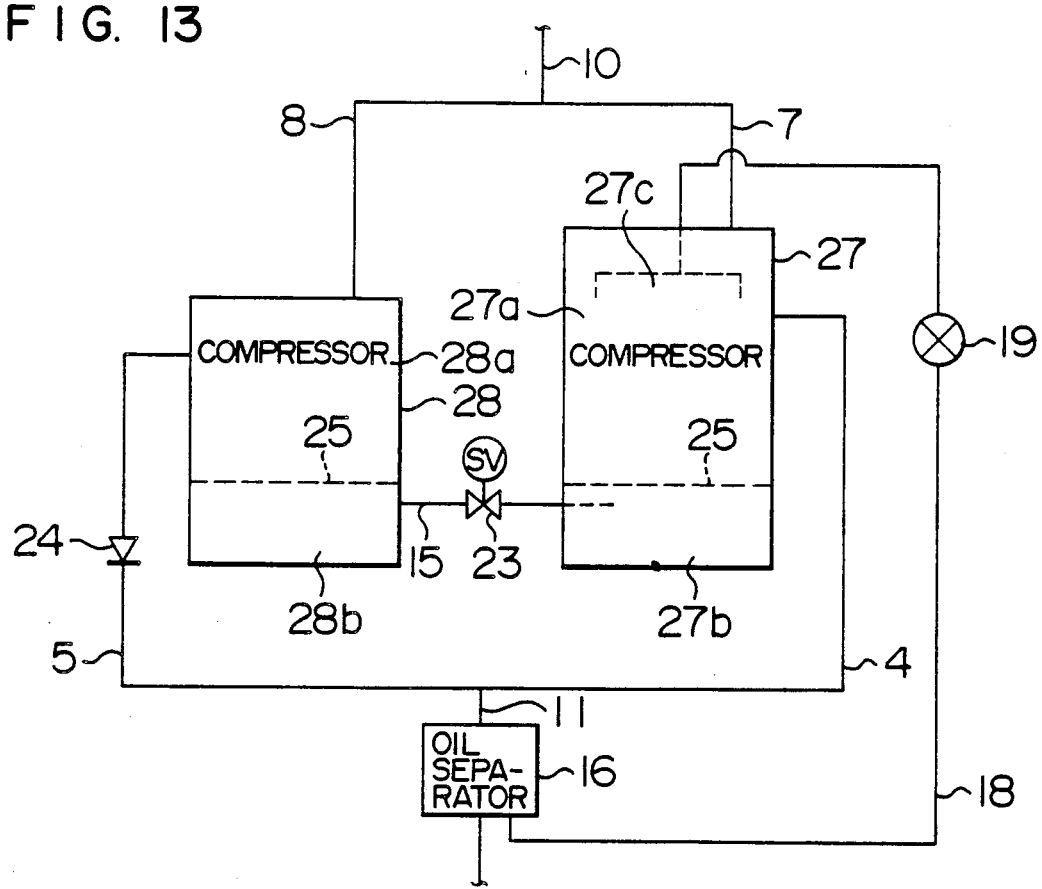
Figure 14:
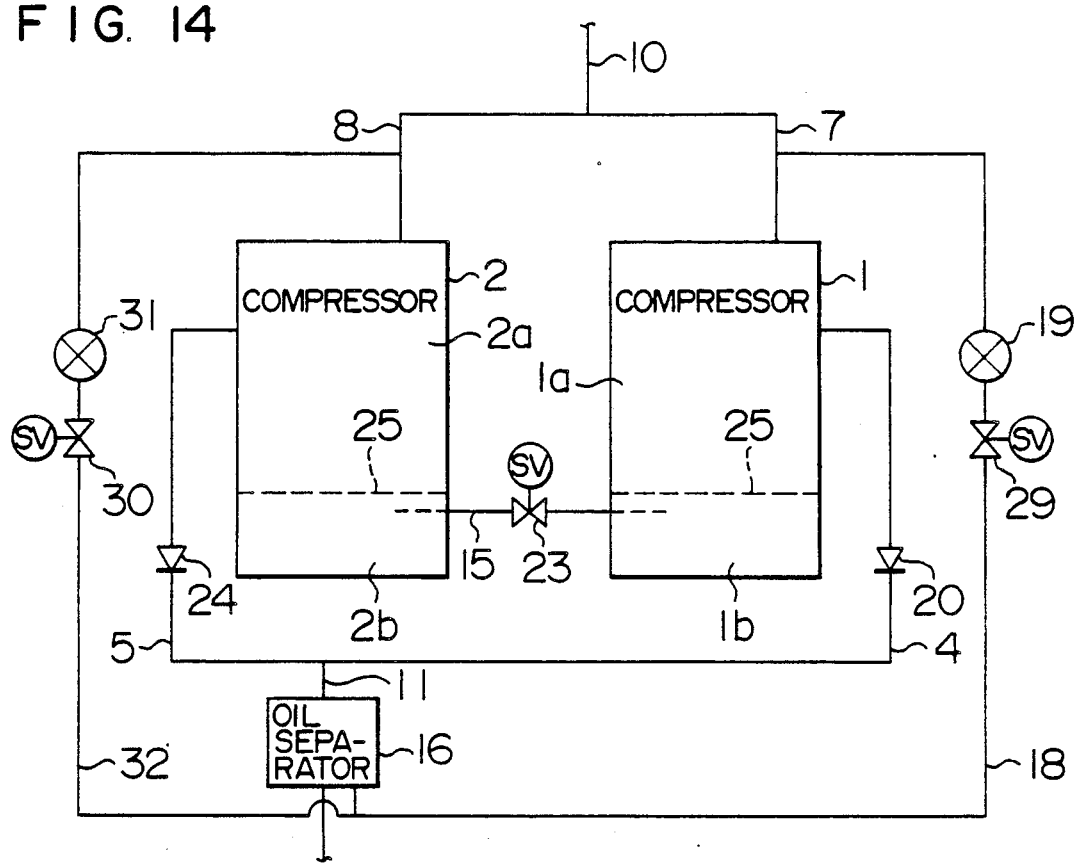
Figure 15:
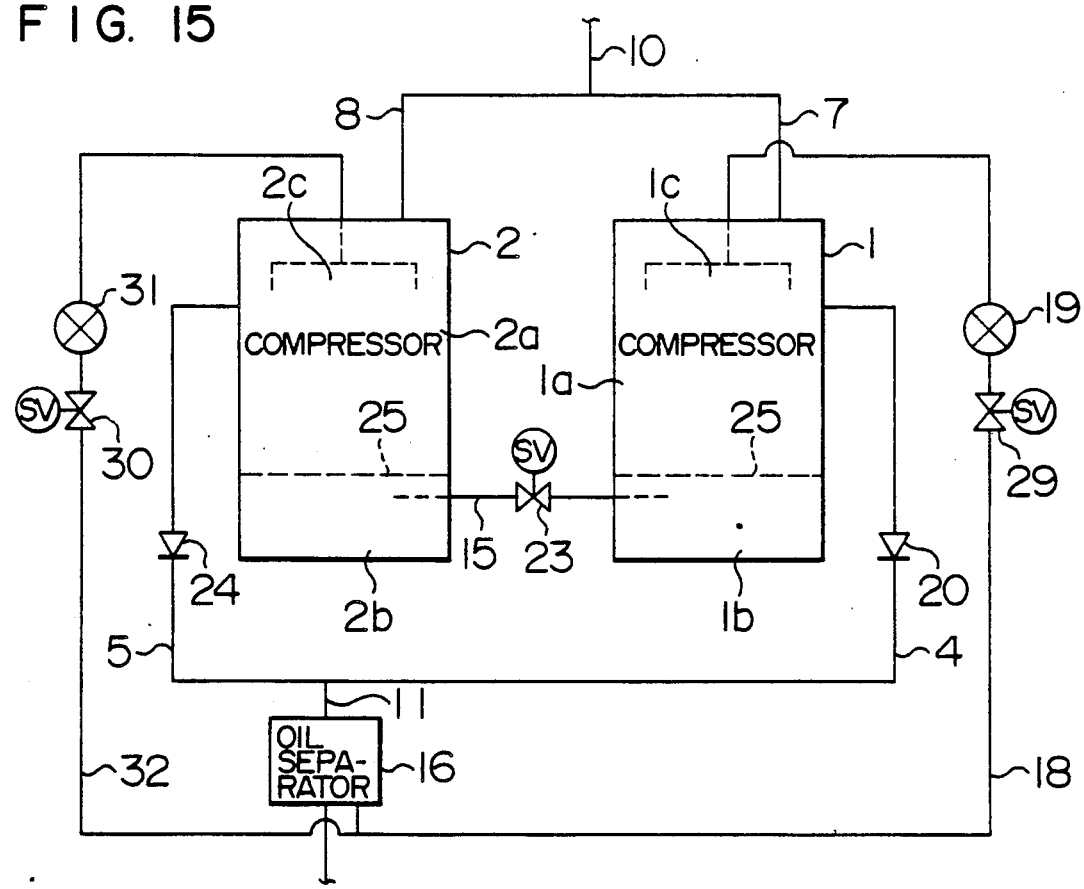
Figure 16:
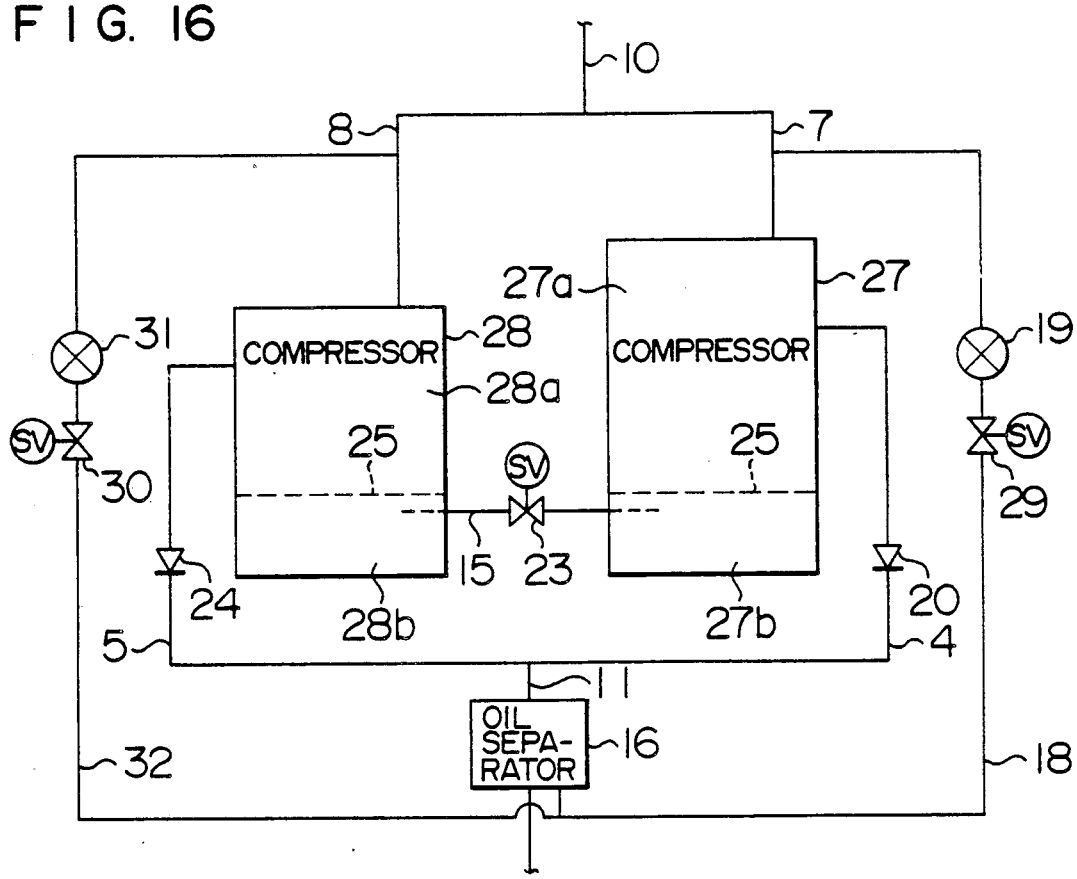
Figure 17:
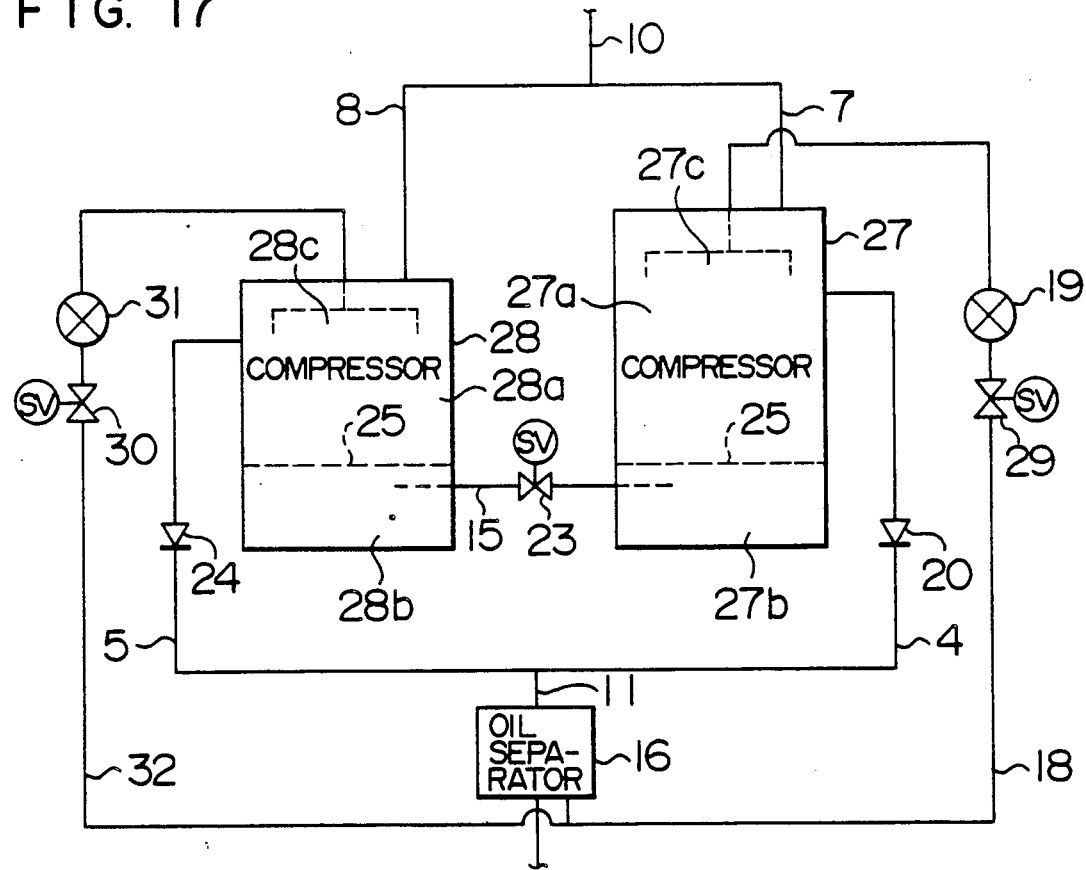
Figure 18:
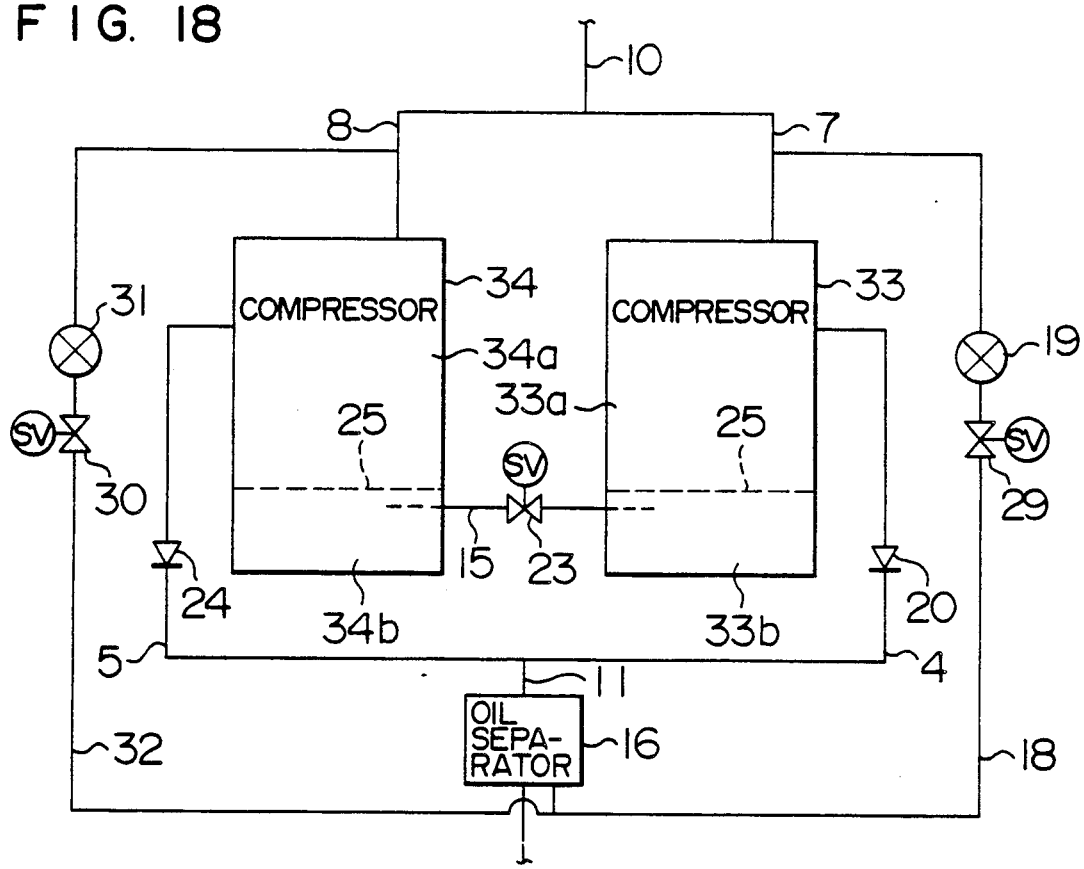
Figure 19:
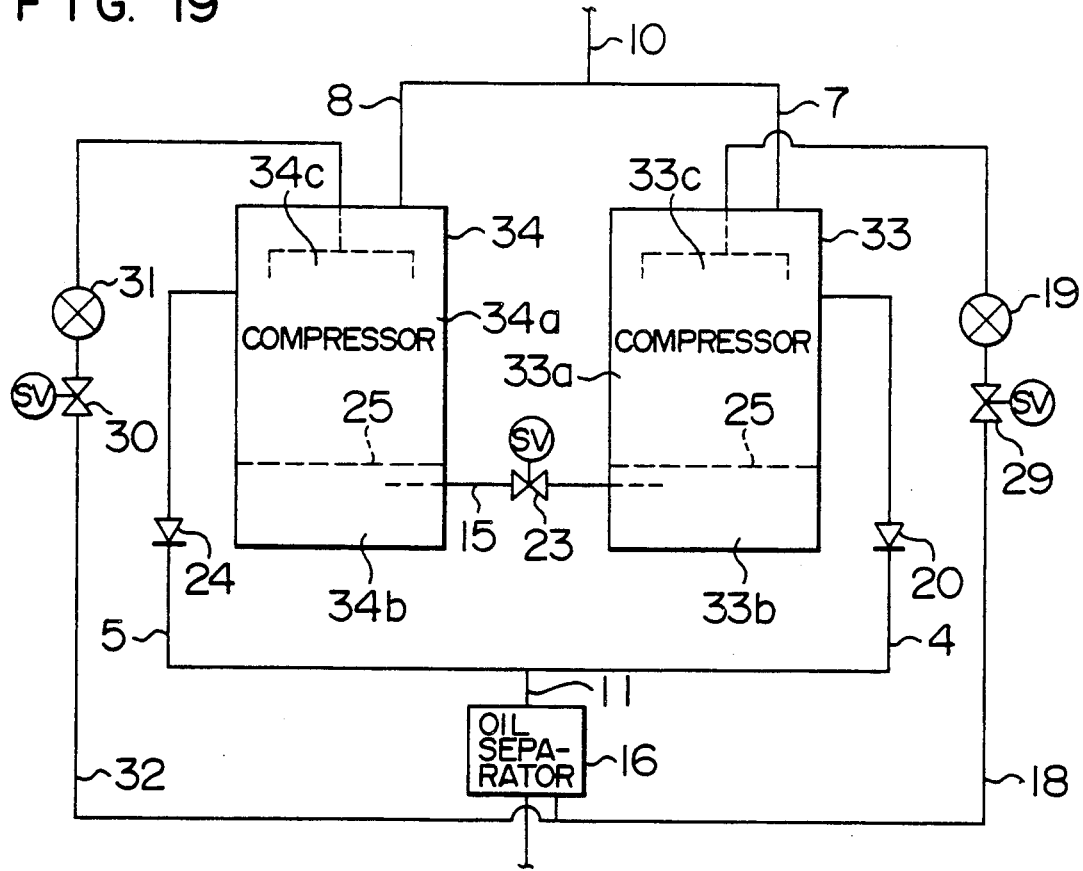
Figure 20:
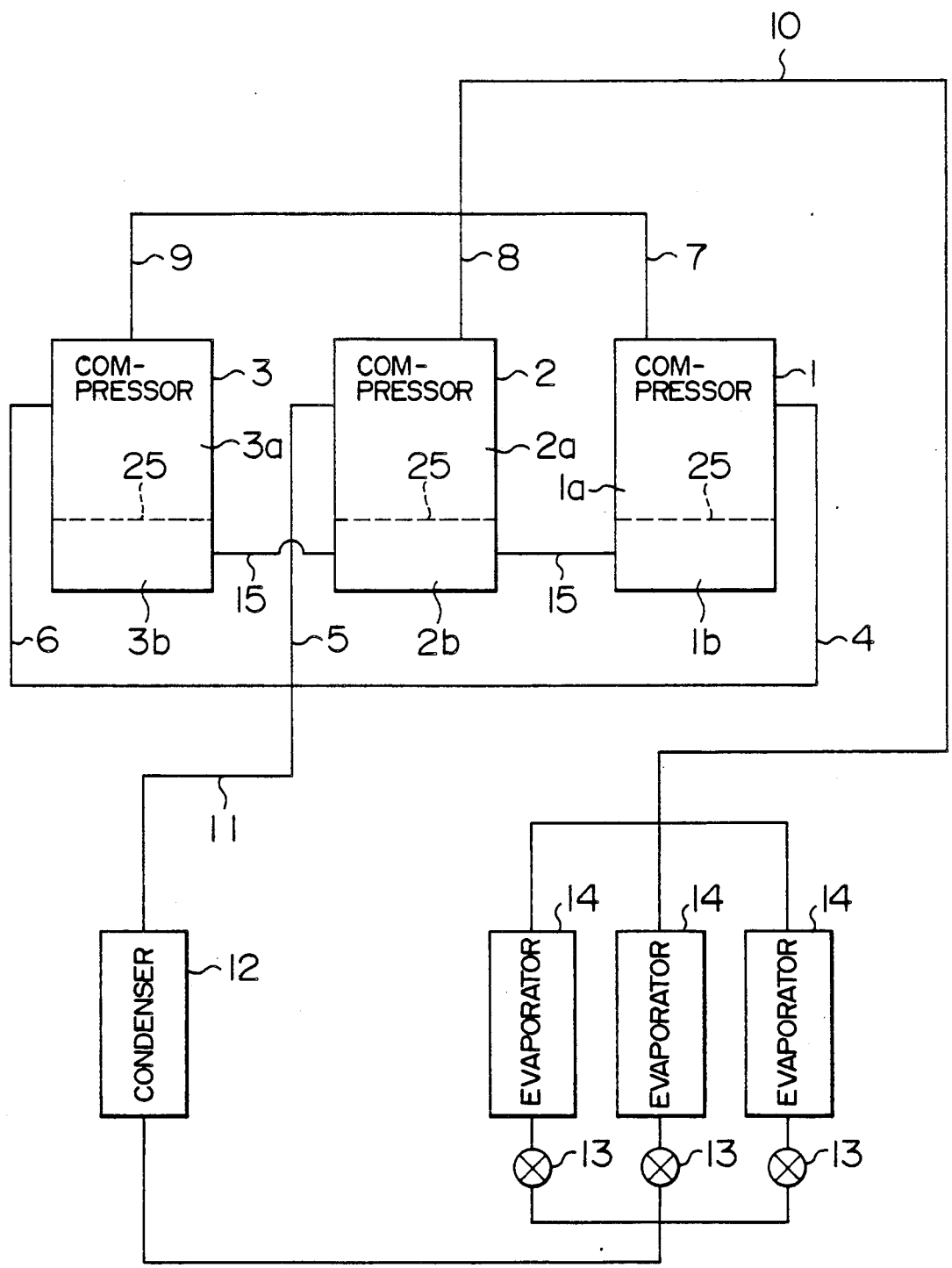
FIG. 20 is a schematic structural diagram of a conventional compressor apparatus when applied to a refrigerating device having a plurality of compressors and evaporators.

FIGS. 6 and 7 show respectively sixth and seventh embodiments of the compressor apparatus according to the present invention. The sixth and seventh embodiments are different from the second and third embodiments in that compressors 27 and 28 are used in place of the compressors 1 and 2. The compressor 27 has a larger capacity than the compressor 28.

Functions are identical with those in the second and third embodiments, respectively, so that explanation thereof will be omitted.

In these embodiments as well, since the compressors 27 and 28 can be operated at the same frequency, the construction of the compressor apparatus can be simplified.

FIGS. 8 to 13 show respectively eighth to thirteenth embodiments of the compressor apparatus according to the present invention. In these embodiments, only the compressors 2 and 28 are enabled to be made inoperative.

The eighth embodiment is a modification of the third embodiment, in which the communication pipe 17, the check valve 21 and the check valve 20 of the discharge pipe 4 of the compressor 1 are dispensed with. The compressors 1 and 2 are fixed capacity type high-pressure chamber compressors, and the compressor 1 is operated at a high frequency.

When the compressors 1 and 2 are operated simultaneously, the stop valve 23 disposed in the oil equalizing pipe 15 is opened. The high-pressure gas refrigerant containing the lubricating oil is discharged from the respective compressors 1 and 2 to be separated from the lubricating oil by means of the oil separator 16 and is then fed to the condenser which is not shown. The lubricating oil thus separated is returned through the oil return pipe 18 and the decompression device 19 to the suction pipe 7 of the compressor 1. The lubricating oil is then returned to the compressor 1 through the suction pipe 7. Further, the lubricating oil gathered in the oil sump 1b of the compressor 1 is supplied through the oil equalizing pipe 15 to the compressor 2 due to a difference in the internal pressure between the compressors 1 and 2. Since the oil equalizing pipe 15 is extended so as to project into the oil sump 1b of the compressor 1 located on the upstream side come similarly to the first embodiment, when the oil level 25 in the compressor 1 on the upstream side is lowered below the opening of the oil equalizing pipe 15, the returned lubricating oil is prevented from being supplied to the compressor 2 on the downstream side by flowing down along the chamber wall of the compressor, thus making it possible to keep the oil level 25 in the compressor 1 on the upstream side at a regular position. It is therefore possible to prevent the nonuniform distribution of the lubricating oil between the compressors 1 and 2.

When the compressor apparatus is operated in a capacity controlling mode in which the compressor 2 is made inoperative, the high-pressure gas refrigerant discharged through the discharge pipe 4 of the compressor 1 is prevented from flowing into the compressor 2 by means of the check valve 24 disposed in the discharge pipe 5 of the compressor 2. The lubricating oil separated from the high-pressure gas refrigerant by means of the oil separator 16 is returned to the suction pipe 7 of the compressor 1 through the oil return pipe 18 and the decompression device 19 and is then returned to the compressor 1. The lubricating oil in the compressor 1 is prevented from being supplied to the compressor 2 by closing the stop valve 23 of the oil equalizing pipe 15. It is therefore possible to keep the lubricating oil in the compressor 2 in the normal state. Further, since the high-pressure gas refrigerant discharged from the compressor 1 is prevented from flowing into the compressor 2 by means of the check valve 24, there is no possibility that the refrigerant dissolves in the lubricating oil in the compressor 2 to dilute the lubricating oil. In addition, even when the compressor 2 is started again, there is no compression of the liquid refrigerant and no occurrence of the foaming, thereby preventing the lowering of the efficiency of the compressor apparatus.

The ninth embodiment is a modification of the eighth embodiment, in which the oil return pipe 18 is connected with a space 1c in the compressor 1, the pressure in the space 1c corresponding to an intermediate pressure obtained in the course of the compression stroke. In this embodiment, in addition to the functions and effects which are identical with those of the eighth embodiment, since the lubricating oil of low temperature is injected into the space of the intermediate pressure in which a high temperature has been reached due to compression, the efficiency of the compressor can be increased owing to the cooling effect of the lubricating oil.

The tenth and eleventh embodiments are modifications of the eighth and ninth embodiments, respectively, in which the throttle 26 is disposed in the discharge pipe 4 of the compressor 1 instead of operating the compressor 1 at a high frequency. Instead of disposing the throttle 26, the length and/or the diameter of the pipe may be adjusted to increase the flow resistance. By making larger the flow resistance of the discharge pipe 4 than that of the discharge pipe 5, the internal pressure of the chamber 1a of the compressor 1 becomes higher than that of the compressor 2.

In these embodiments, the same functions and effects as those of the eighth and ninth embodiments can be attained, respectively.

The twelfth and thirteenth embodiments are modifications of the eighth and ninth embodiments, respectively, in which the compressors 27 and 28 are used in place of the compressors 1 and 2. The compressor 27 has a larger capacity and a higher internal pressure than the compressor 28.

In these embodiments, the same functions and effects as those of the eighth and ninth embodiments can be attained, respectively. Further, since it is possible to operate the compressors 27 and 28 at the same frequency, the construction of the compressor apparatus can be simplified.

FIGS. 14 to 19 show respectively fourteenth to nineteenth embodiments of the compressor apparatus according to the present invention. In these embodiments, the parallel-connected high-pressure chamber compressors 1 and 2 are both enabled to be made inoperative for the purpose of controlling the capacity.

The fourteenth embodiment is a modification of the eighth embodiment, in which the check valve 20 is disposed in the discharge pipe 4 of the compressor 1 so as to prevent the high-pressure gas refrigerant from flowing into the compressor 1, an oil return pipe 32 is connected between the oil separator 16 and the suction pipe 8 of the compressor 2, the oil return pipe 32 is provided with a stop valve 30 serving to close the oil return pipe 32 and a decompression device 31, and the oil return pipe 18 is provided with a stop valve 29 serving to close the oil return pipe 18. Further, the oil equalizing pipe 15 through which the oil sumps 1b and 2b of the compressors 1 and 2 are connected with each other is extended so as to project into both of the oil sumps 1b and 2b. The compressor 1 is operated at a higher frequency, that is, with a larger capacity, than the compressor 2.

When the compressors 1 and 2 are operated simultaneously, the stop valve 23 disposed in the oil equalizing pipe 15 is opened, the stop valve 30 of the oil return pipe 32 is closed, and the stop valve 29 of the oil return pipe 18 is opened. The high-pressure gas refrigerant containing the lubricating oil is discharged from the respective compressors 1 and 2 to be separated from the lubricating oil by means of the oil separator 16 and is then fed to the condenser which is not shown. The lubricating oil thus separated is returned through the oil return pipe 18 and the decompression device 19 to the suction pipe 7 of the compressor 1. The lubricating oil is then returned to the compressor 1 through the suction pipe 7. Further, the lubricating oil gathered in the oil sump 1b of the compressor 1 is supplied through the oil equalizing pipe 15 to the compressor 2 due to a difference in the internal pressure between the compressors 1 and 2. Since the oil equalizing pipe 15 is extended so as to project into the oil sump 1b of the compressor 1 located on the upstream side, similarly to the first embodiment, when the oil level 25 in the compressor 1 on the upstream side is lowered below the opening of the oil equalizing pipe 15, the returned lubricating oil is prevented from being supplied to the compressor 2 on the downstream side by flowing down along the chamber wall of the compressor 1, thus making it possible to keep the oil level 25 in the compressor 1 on the upstream side at a regular position. It is therefore possible to prevent the nonuniform distribution of the lubricating oil between the compressors 1 and 2.

When the compressor apparatus is operated in a capacity controlling mode in which the compressor 2 is made inoperative, the stop valves 23 and 30 are closed. The high-pressure gas refrigerant discharged through the discharge pipe 4 of the compressor 1 is prevented from flowing into the compressor 2 by means of the check valve 24 disposed in the discharge pipe 5 of the compressor 2. The lubricating oil separated from the high-pressure gas refrigerant by means of the oil separator 16 is returned to the suction pipe 7 of the compressor 1 through the oil return pipe 18 and the decompression device 19 and is then returned to the compressor 1. The lubricating oil in the compressor 1 is prevented from being supplied to the compressor 2 by the closing of the stop valve 23 of the oil equalizing pipe 15. It is therefore possible to keep the lubricating oil in the compressor 2 in the normal state. Further, since the high-pressure gas refrigerant discharged from the compressor 1 is prevented from flowing into the compressor 2 by means of the check valve 24, there is no possibility for the refrigerant to be dissolved in the lubricating oil in the compressor 2 and thereby undesirably dilute the lubricating oil thereat. In addition, even when the compressor 2 is started again, that is becomes operational, there is no compression of the liquid refrigerant and no occurrence of the foaming, thereby preventing the lowering of the efficiency of the compressor apparatus.

When the compressor apparatus is operated in a capacity controlling mode in which the compressor 1 is made inoperative, the stop valves 23 and 29 are closed. The high-pressure gas refrigerant discharged through the discharge pipe 5 of the compressor 2 is prevented from flowing into the compressor 1 by means of the check valve 20 disposed in the discharge pipe 4 of the compressor 1. The lubricating oil separated from the high-pressure gas refrigerant by means of the oil separator 16 is returned to the suction pipe 8 of the compressor 2 through the oil return pipe 32 and the decompression device 31 and is then returned to the compressor 2. The lubricating oil in the compressor 2 is prevented from being supplied to the compressor 1 by the closing of the stop valve 23 of the oil equalizing pipe 15. It is therefore possible to keep the lubricating oil in the compressor 1 in the normal state. Further, since the high-pressure gas refrigerant discharged from the compressor 2 is prevented from flowing into the compressor 1 by means of the check valve 20, there is no possibility for the refrigerant to be dissolved in the lubricating oil in the compressor 1 to dilute the lubricating oil thereat. In addition, even when the compressor 1 is started again, that is becomes operational, there is no compression of the liquid refrigerant and no occurrence of the foaming, thereby preventing the lowering of the efficiency of the compressor apparatus. Furthermore, since the compressor to be made inoperative for controlling the capacity is not specified, the lifetime of the compressor apparatus can be extended.

The fifteenth embodiment is a modification of the fourteenth embodiment, in which the oil return pipes 18 and 32 are connected with spaces 1c and 2c in the compressors 1 and 2, respectively, the pressure in each space 2c, 2c corresponding to an intermediate pressure obtained in the course of the compression stroke. In this embodiment, in addition to the functions and effects which are identical with those of the fourteenth embodiment, since the lubricating oil of low temperature is injected into the space of the intermediate pressure in which a high temperature has been reached due to compression, the efficiency of the compressor can be increased owing to the cooling effect of the lubricating oil.

The sixteenth and seventeenth embodiments are modifications of the fourteenth and fifteenth embodiments, respectively, in which the compressors 27 and 28 are used in place of the compressors 1 and 2, and the compressor 27 has a larger capacity and a higher internal pressure than the compressor 28.

In these embodiments, the same functions and effects as those of the fourteenth and fifteenth embodiments can be obtained, respectively. Further, since it is possible to operate the compressors 27 and 28 at the same frequency, the construction of the compressor apparatus can be simplified.

The eighteenth and nineteenth embodiments are modifications of the fourteenth and fifteenth embodiments, respectively, in which variable capacity type high-pressure chamber compressors 33 and 34 are used in place of the fixed capacity type high-pressure chamber compressors 1 and 2.

In these embodiments, the same functions and effects as those in the fourteenth and fifteenth embodiments can be obtained, respectively. Further, since the capacities of the compressors 33 and 34 are variable, the capacity of the compressor apparatus can be controlled continuously.

What is claimed is:

1. A capacity controllable compressor apparatus comprising:

a plurality of high-pressure chamber compressors which are connected in parallel to a common refrigerant suction pipe and a common refrigerant discharge pipe having an oil separator, one of said compressors being operated with its chamber kept at a higher internal pressure than the other compressors;

means for returning lubricating oil separated from discharged refrigerant, by said oil separator to a suction side of that one of said compressors operated with its chamber kept at the higher internal pressure;

oil equalizing pipes through which oil sumps of said plurality of compressors communicate with each other;

first control means disposed in said oil equalizing pipes so as to prevent the lubricating oil from flowing, through respective ones of said oil equalizing pipes, from a compressor which is in operation into one which is being made inoperative in accordance with effecting control of the capacity of the compressor apparatus; and valve means disposed in a discharge pipe of said inoperative compressor so as to prevent refrigerant, discharged by one or more compressors which are in operation, from flowing into said inoperative compressor.

2. A capacity controllable compressor apparatus according to claim 1, wherein said first control means includes check valves disposed in said oil equalizing pipes so as to prevent the lubricating oil from flowing, via respective equalizing pipes, from a compressor which is in operation into said inoperative compressor.

3. A capacity controllable compressor apparatus according to claim 1, wherein said first control means includes stop vales serving to close said oil equalizing pipes so as to prevent the lubricating oil from following, via respective equalizing pipes, from a compressor which is in operation into said inoperative compressor.

4. A capacity controllable compressor apparatus according to claim 1, wherein said valve means includes check valves disposed to prevent refrigerant, discharged by one or more compressors which are in operation, from flowing into said inoperative compressor.

5. A capacity controllable compressor apparatus according to claim 1, wherein the lubricating oil return means includes an oil return pipe connected between said oil separator and a refrigerant suction pipe of said compressor operated with its chamber kept at a higher internal pressure, and communication pipes each serving to communicate between adjacent refrigerant suction pipes of said plurality of compressors at a point downstream of a point where said oil return pipe is connected to said refrigerant suction pipe.

6. A capacity controllable compressor apparatus according to claim 1, wherein the lubricating oil return means includes an oil return pipe connected between said oil separator and a refrigerant suction pipe connected to said compressor operated with its chamber kept at a higher internal pressure.

7. A capacity controllable compressor apparatus according to claim 1, wherein the lubricating oil return means includes an oil return pipe connected between said oil separator and a space in said compressor operated with its chamber kept at a higher internal pressure, the pressure in said space corresponding to an intermediate pressure obtained in the course of the compression stroke.

8. A capacity controllable compressor apparatus according to claim 1, wherein the lubricating oil return means includes oil return pipes each connected between said oil separator and a space in a respective one of said plurality of compressors, the pressure in each space corresponding to an intermediate pressure obtained in the course of the compression stroke, and stop valves serving to close said oil return pipes, respectively.

9. A capacity controllable compressor apparatus according to claim 1, wherein the lubricating oil return means includes oil return pipes each connected between said oil separator and a respective one of refrigerant suction pipes connected to said plurality of compressors, and stop valves serving to close said oil return pipes, respectively.

10. A capacity controllable compressor apparatus according to claim 1, wherein a discharge pipe of said compressor operated with its chamber kept at a higher internal pressure has a larger flow resistance than that of other ones of said compressors.

11. A capacity controllable compressor apparatus according to claim 1, wherein said plurality of high-pressure chamber compressors are of the fixed capacity type.

12. A capacity controllable compressor apparatus according to claim 1, wherein, out of said plurality of high-pressure chamber compressors, at least the compressor operated with its chamber kept at said high internal pressure is of the variable capacity type.

13. A capacity controllable compressor apparatus according to claim 11, wherein said compressor operated with its chamber kept at a higher internal pressure has a larger capacity than other ones of said compressors.

14. A capacity controllable compressor apparatus according to claim 12, wherein said compressor operated with its chamber kept at a higher internal pressure has a larger capacity than other ones of said compressors.

15. A capacity controllable compressor apparatus according to claim 1, wherein the lubricating oil return means includes decompression devices.

16. A capacity controllable compressor apparatus according to claim 1, wherein each one of said oil equalizing pipes is extended so as to project into the oil sump of the compressor located on the upstream side with respect to the flow of the lubricating oil.

17. A capacity controllable compressor apparatus according to claim 1, wherein said compressor operated with its chamber kept at a higher internal pressure has a larger capacity than other ones of said compressors.

18. A capacity controllable compressor apparatus according to claim 3, wherein said valve means includes check valves disposed to prevent refrigerant, discharged by one or more compressors which are in operation, from flowing into said inoperative compressor.

19. A capacity controllable compressor apparatus according to claim 2, wherein said valve means includes check valves disposed to prevent refrigerant discharged by one or more compressors which are in operation, from flowing into said inoperative compressor.

20. A capacity controllable compressor apparatus according to claim 19, wherein the lubricating oil return means includes an oil return pipe connected between said oil separator and a refrigerant suction pipe of said compressor operated with its chamber kept at a higher internal pressure, and communication pipes each serving to communicate between adjacent refrigerant suction pipes of said plurality of compressors at a point downstream of a point where said oil return pipe is connected to said refrigerant suction pipe.

21. A capacity controllable compressor apparatus according to claim 18, wherein the lubricating oil return means includes an oil return pipe connected between said oil separator and a refrigerant suction pipe connected to said compressor operated with its chamber kept at a higher internal pressure.

22. A capacity controllable compressor apparatus according to claim 3, wherein the lubricating oil return means includes an oil return pipe connected between said oil separator and a space in said compressor operated with its chamber kept at a higher internal pressure, the pressure in said space corresponding to an intermediate pressure obtained in the course of the compression stroke.

23. A capacity controllable compressor apparatus according to claim 18, wherein the lubricating oil return means includes an oil return pipe connected between said oil separator and a space in said compressor operated with its chamber kept at a higher internal pressure, the pressure in said space corresponding to an intermediate pressure obtained in the course of the compression stroke.

24. A capacity controllable compressor apparatus according to claim 18, wherein the lubricating oil return means includes oil return pipes each connected between said oil separator and a space in a respective one of said plurality of compressors, the pressure in each space corresponding to an intermediate pressure obtained in the course of the compression stroke, and stop valves serving to close said oil return pipes, respectively.

25. A capacity controllable compressor apparatus according to claim 18, wherein the lubricating oil return means includes oil return pipes each connected between said oil separator and a respective one of refrigerant suction pipes connected to said plurality of compressors, and stop valves serving to close said oil return pipes, respectively.

26. A capacity controllable compressor apparatus according to claim 5, wherein each one of said oil equalizing pipes is extended so as to project into the oil sump of the compressor located on the upstream side with respect to the flow of the lubricating oil.

27. A capacity controllable compressor apparatus according to claim 7, wherein each one of said oil equalizing pipes is extended so as to project into the oil sump of the compressor located on the upstream side with respect to the flow of the lubricating oil.

28. A capacity controllable compressor apparatus according to claim 8, wherein each one of said oil equalizing pipes is extended so as to project into the oil sump of the compressor located on the upstream side with respect to the flow of the lubricating oil.

29. A capacity controllable compressor apparatus according to claim 9, wherein each one of said oil equalizing pipes is extended so as to project into the oil sump of the compressor located on the upstream side with respect to the flow of the lubricating oil.

* * * * *